April 7, 1959

W. A. KROPP 2,880,569

SYNCHRONOUS MOTOR SECONDARY CLOCK

Filed June 18, 1954

INVENTOR.
WILLIS A. KROPP

BY Geoffrey Knight

ATTORNEY

April 7, 1959     W. A. KROPP     2,880,569
SYNCHRONOUS MOTOR SECONDARY CLOCK

Filed June 18, 1954     5 Sheets-Sheet 2

*INVENTOR.*
WILLIS A. KROPP

BY *Geoffrey Knight*

ATTORNEY

April 7, 1959 W. A. KROPP 2,880,569
SYNCHRONOUS MOTOR SECONDARY CLOCK
Filed June 18, 1954 5 Sheets-Sheet 3

INVENTOR.
WILLIS A. KROPP
BY Geoffrey Knight
ATTORNEY

April 7, 1959

W. A. KROPP 2,880,569

SYNCHRONOUS MOTOR SECONDARY CLOCK

Filed June 18, 1954

INVENTOR.
WILLIS A. KROPP

BY Geoffrey Knight

ATTORNEY

April 7, 1959
W. A. KROPP
2,880,569
SYNCHRONOUS MOTOR SECONDARY CLOCK
Filed June 18, 1954
5 Sheets-Sheet 5
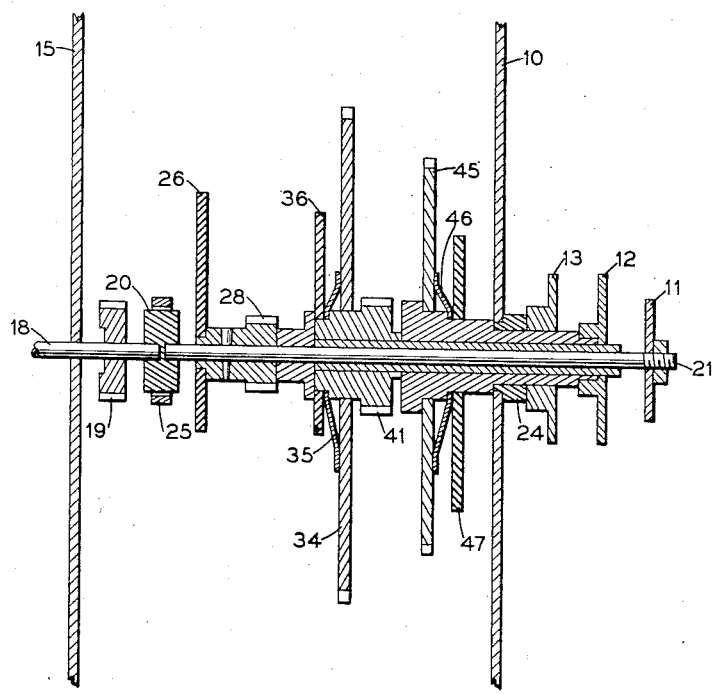
FIG. 5
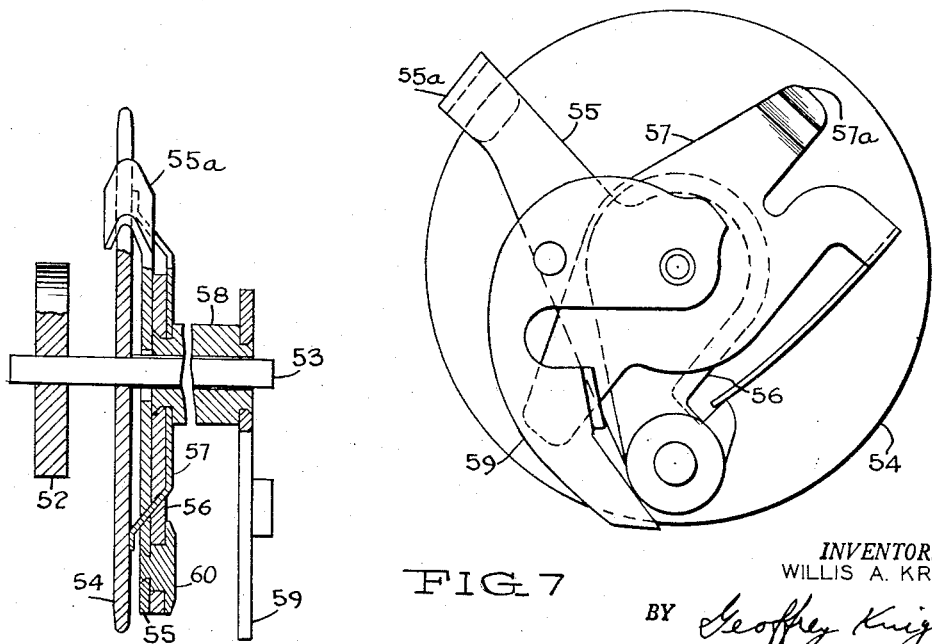
FIG. 6
FIG. 7
INVENTOR.
WILLIS A. KROPP
BY Geoffrey Knight
ATTORNEY

United States Patent Office 2,880,569
Patented Apr. 7, 1959

2,880,569

SYNCHRONOUS MOTOR SECONDARY CLOCK

Willis Ahlborn Kropp, Binghamton, N.Y., assignor to International Business Machines Corporation, New York, N.Y., a corporation of New York Application June 18, 1954, Serial No. 437,668

6 Claims. (Cl. 58—34)

The present invention relates to timekeeping apparatus and, more particularly, to secondary clocks and similar timekeeping units of the type normally driven by individual driving motors, as for example, synchronous alternating current motors which are automatically regulated at selected intervals in response to time signals transmitted from a source of correct or standard time.

The present invention is designed as an improvement over the structure shown and described in the U. S. patent to Larrabee, No. 2,569,815, dated October 2, 1951, for a Synchronous Motor Controlled Secondary Clock. In the above-mentioned patent the clock mechanism is adapted to be uniformly and continuously driven by means of a synchronous alternating current motor which receives its current from the commercial 60-cycle power line. Means are also provided whereby an electrical signal is transmitted to the secondary clock over the regular power line at a moment which occurs slightly before the fifty-ninth minute of each hour and which serves to initiate a correction cycle precisely at the fifty-ninth minute of the hour whereby, if the secondary clock is running slow with respect to a standard time source at the fifty-ninth minute of the hour, it will be brought up to the correct time during the sixtieth minute of the hour so that when the sixtieth minute is completed and the first minute of the next succeeding hour commences, the clock will be accurately synchronized with the standard time source.

The special or time-correcting signal imparted to the secondary clock over the regular commercial channel is preferably of a high frequency nature and it is employed to energize a magnet which, by tripping a latch, initiates the correction cycle. Once the magnet has been energized and the latch tripped, the correction cycle proceeds to its logical conclusion. Consequently, the secondary clock is corrected once each hour.

The present invention is designed to provide for selective correction of the seconds hand, the seconds and minutes hands, the seconds, minutes and hours hands, and for correction of the seconds hands at more frequent intervals than heretofore provided. Specifically, the seconds hand is corrected every fifteen minutes; the seconds and minutes hands are corrected every hour; the seconds, minutes and hours hands are corrected every twelve hours. The provision of a secondary clock of this character is the principal object of the invention.

Another object of the invention is to provide secondary timekeeping apparatus of the type referred to which is of improved construction and arrangement of parts.

A further object is to provide a novel form of secondary clock construction which includes an improved structural combination and arrangement of parts for advancing the clock, when slow, to a chronological position coincident with the standard time source.

It is still another object of the invention to provide a secondary clock construction having seconds, minutes and hours hands with a plurality of cyclically operated levers which are selectively operated at predetermined intervals to independently advance or retard the clock hands.

It is another object of the invention to provide a secondary clock construction having seconds, minutes and hours hands with an independent lever system associated with each hand which are cyclically operated at different timed intervals dependent upon the length of a time signal to independently and individually advance or retard its associated clock hand.

It is yet another object of the invention to provide a driven cam having an eccentric cam surface with an outwardly opening slot extending along a portion of the cam surface which permits flexing of the same under adverse operating conditions.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 5 is a horizontal sectional view taken substantially along the line 5—5 of Fig. 1.

Fig. 6 is an enlarged sectional side view of the time-correcting drive assembly taken along the line 6—6 of Fig. 3 to more clearly show the relationship of parts and the drive connections.

Fig. 7 is a front plan view of the time-correcting drive assembly as shown in Fig. 6 with the overlapping portions of elements distorted to more clearly show the positional relationship.

In all of the above-described views like characters of reference are employed to designate like parts.

CLOCK MOVEMENT STRUCTURE

Figure 1:
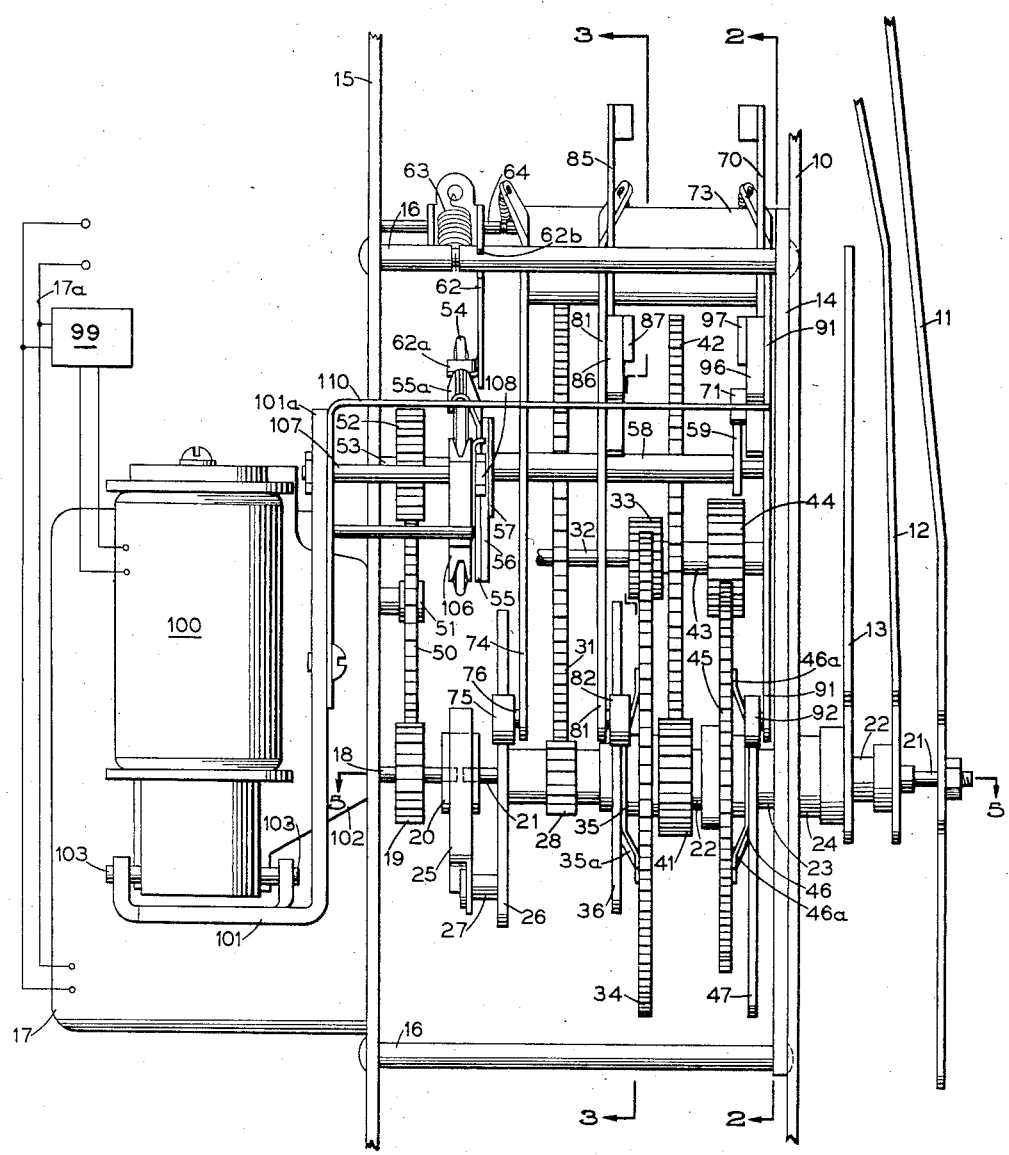
Fig. 1 is a partial sectional side view of a secondary clock mechanism constructed in accordance with the principles of the present invention.
Figure 2:
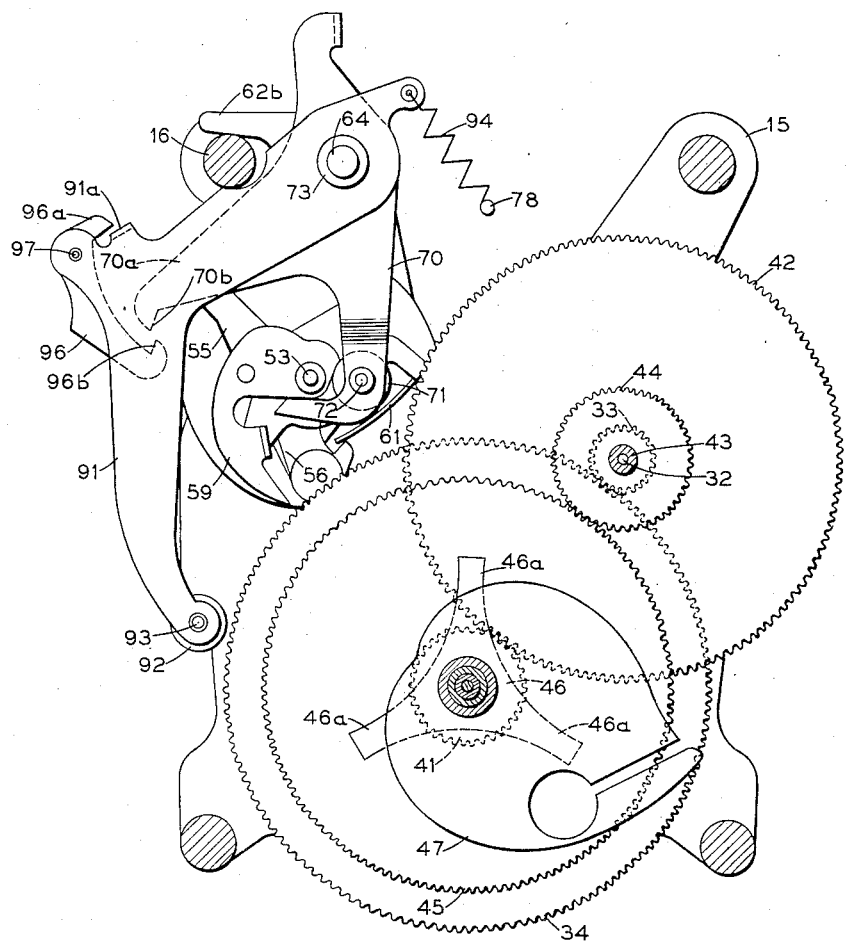
Fig. 2 is a vertical sectional view taken substantially along the line 2—2 of Fig. 1 with portions omitted to more clearly show the invention.

Referring now in detail to the drawings wherein a preferred form of an automatically regulated secondary clock construction is shown, the clock comprises the usual face plate 10, seconds hand 11, minutes hand 12, and hours hand 13. Parallel front and rear support plates of the clock are indicated at 14 and 15, respectively, and they are suitably secured in their predetermined spaced relationship by pillars 16. An electric clock driving means or motor 17 is preferably of the self-starting synchronous type and is adapted to be driven at its designated time rate from the available frequency-regulated A.C. light and power line or circuit 17a. The output or drive shaft 18 of the motor 17 has mounted thereon a pinion gear 19 and the drum 20.

As shown in Figs. 1 and 5, a seconds shaft 21 is journaled at its inner or rear end by the drum 20 and is rotatably supported at its outer or forward end in a minutes sleeve 22, the latter being in turn journaled in an hours sleeve 23 which is rotatably supported within a bearing 24 rigidly mounted in the front support plate 14.

The seconds shaft 21 is rotated by the drum 20 through a suitable friction drive connection. In this instance, the driving connection comprises a substantially U-shaped spring or friction member 25 which has its opposite open arms straddling the drum 20 and bearing frictionally inwardly against the peripheral surface of the drum 20. The closed end of the U-shaped friction member 25 is attached by means of a stud 27 to a seconds shaft correction cam 26 which is fixedly secured to the seconds shaft 21. A seconds pinion 28 is fixedly mounted to the seconds shaft 21. The pinion gear 19 and drum 20 are adapted to be rotated when the motor 17 is energized at the rate of one revolution per minute and, as a consequence, the drum 20 frictionally drives the seconds shaft 21 through the cam 26. Normally the seconds shaft 21 operates at the regular speed of one r.p.m. However, the friction drive connection permits relative rotary movement between the drum 20 and the seconds shaft 21 when required for seconds hand time-correcting operations, as will later appear.

The seconds hand 11 is connected to the forward end of the seconds shaft 21. The seconds correction cam 26 and the seconds hand 11 move together with the seconds shaft 21, and the cam 26, therefore, occupies a definite angular position with respect to the seconds hand 11.

The seconds pinion 28 is in mesh with gear 31 mounted on a countershaft 32, the latter being journaled at its two ends in the two clock support plates 14 and 15, respectively, (not shown) and being arranged in spaced parallel relation with respect to the seconds shaft 21 and minutes sleeve 22. A pinion 33 is also fixed to the countershaft 32 and meshes with a minutes drive gear 34 loosely mounted on the minutes sleeve 22. A friction clutch or member 35 is in the form of a disc-like element having a flat hub portion from which there projects radially a series of bowed spring fingers 35a which bear against the rear face of the gear 34. The flat hub portion of the friction member 35 and the minutes correction cam 36 are arranged in juxtaposition and are fixedly secured to the inner or rear end of the minutes sleeve 22. The minutes sleeve 22 carries the minutes hand 12 at its outer or forward end which terminates short of the seconds shaft 21. Cam 36 bears a definite angular relationship with respect to the minutes hand 12. The gears 28, 31, 33 and 34 form a conventional gear train and are so designed as to frictionally drive the minutes sleeve 22 through the friction member 35 at the proper time rate of one revolution per hour. The friction member 35 permits relative rotary motion between the cam 36 and the gear 34 during a time-correcting cycle or period, as will appear presently.

A pinion gear 41 rigidly attached to the minutes sleeve 22 meshes with a gear 42 fixedly mounted on a hub 43, which is rotatably mounted on the shaft 32. A pinion gear 44 is also fixed to the hub 43 and meshes with a gear 45 loosely mounted on the inner or rear end of the hours sleeve 23. A friction clutch or member 46 is in the form of a disc-like element having a flat hub portion from which there projects radially a series of bowed spring fingers 46a which bear against the forward face of the gear 45. The flat hub portion of the friction member 46 and the hours correction cam 47 are arranged in juxtaposition and are firmly secured to the hours sleeve 23. The hours sleeve 23 carries the hours hand 13 at its forward end which terminates short of the minutes sleeve 22. Cam 47 occupies a definite angular relationship with respect to the hours hand 13. The gears 41, 42, 44 and 45 are so designed as to frictionally drive the hours sleeve 23 through the friction member 46 at the proper time rate of one revolution per twelve hours. The friction member 46 permits relative rotary movement between the cam 47 and the gear 45 during a time-correcting period, as will be subsequently described.

In the above-described apparatus the seconds, minutes and hours hands and their associated mechanisms form independent units which are connected together for operation in unison by means of their respective friction clutches.

Figure 3:
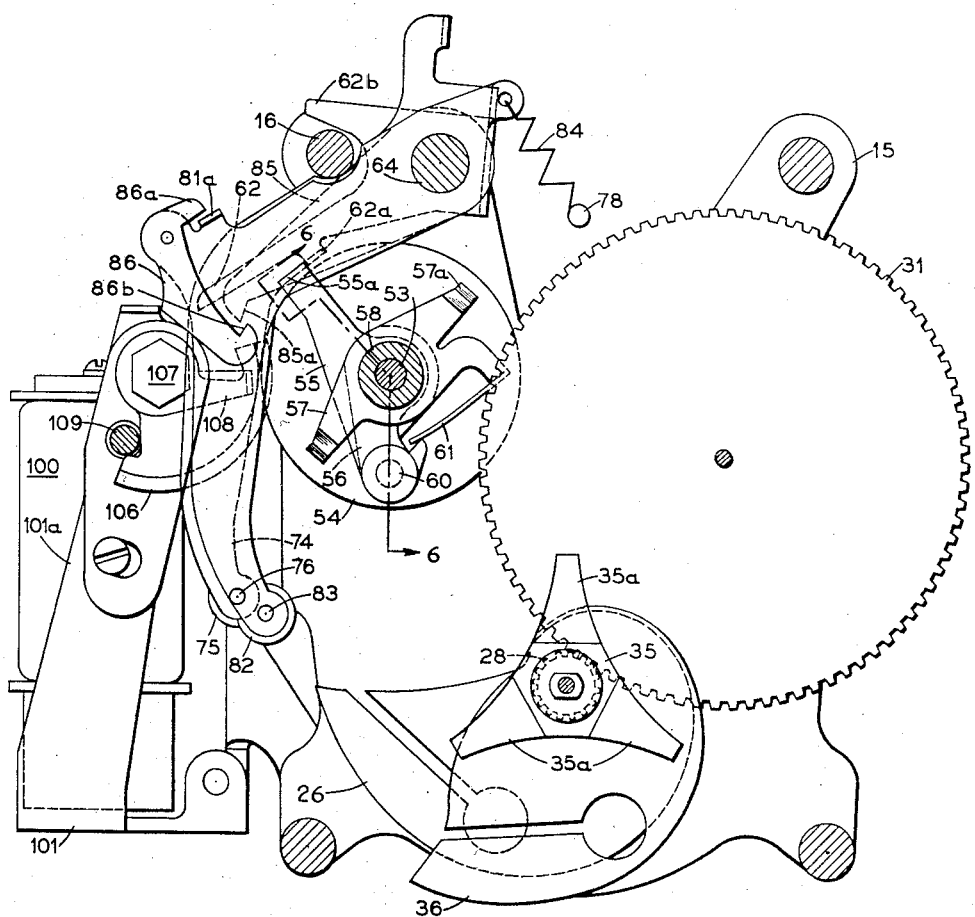
Fig. 3 is a vertical sectional view taken substantially along the line 3—3 of Fig. 1 with portions omitted to more clearly show the invention.
Figure 4:
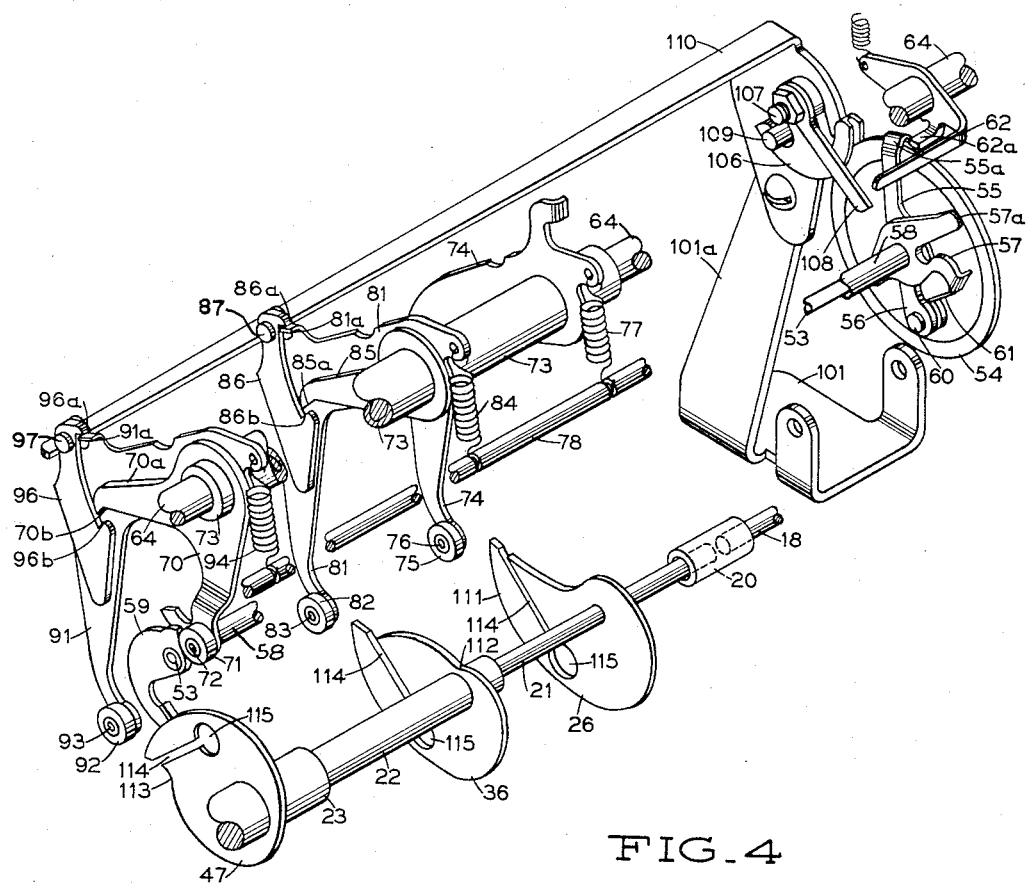
Fig. 4 is a schematic perspective view showing the improved time-correcting mechanism employed in connection with the present invention.

Referring now to Figs. 1, 3 and 4, the pinion gear 19 meshes with and drives an idler gear 50 journaled on a stud 51, the latter being attached to the rear plate 15. The gear 50 in turn meshes with a small gear 52 fixedly mounted on a countershaft 53, the latter being rotatably supported in the front and rear plates 14 and 15, respectively. A rotatable disc 54 disposed adjacent the rear support plate 15 is secured to the countershaft 53 and has a wedge-shaped peripheral surface to effect a tractional function with time delay mechanism to be hereinafter described. It should be borne in mind at this point that the gears 19, 50 and 52 remain in constant motion at all times while the motor 17 is energized and these gears are so designed that the countershaft 53, together with disc 54, is adapted to rotate continuously at the rate of one revolution per minute.

The disc 54 is adapted to impart its rotation to a time-correcting drive assembly comprising an offset clutch arm 55, a crank arm 56, a friction member 57, a sleeve 58 and an axially displaced drive or motor cam 59 secured to the sleeve and disposed adjacent the front support plate 14. The clutch arm 55, having a hooked portion 55a at its outer free end shaped so as to conform to the contour of the wedge-shaped peripheral surface of disc 54, is pivotally secured at 60 to the free end of the crank arm 56. The arm 56 is secured to the rear end of the sleeve 58, the latter being loosely mounted on the countershaft 53 forwardly of the driving disc 54. The friction member 57 is in the form a disc-like element having a flat hub portion which is positioned adjacent to the crank arm 56 and firmly secured to the sleeve 58. Projecting from the hub portion of friction member 57 is a pair of bowed spring fingers 57a which bear against the forward face of the rotating disc 54 and slideably engage the same to constantly urge the assembly in a clockwise direction about the countershaft 53 for the purpose of keeping clutch arm 55 disengaged, as will appear later.

The time-correcting drive assembly is normally held against rotation at a predetermined angular position by the coaction of the clutch arm 55 and a rocker arm defining a clutch arm detent 62, as will be explained subsequently. Referring to Figs. 3 and 4, the clutch arm 55 is spring-biased in a clockwise direction about its pivot 60 by means of a leaf spring or the like 61, which in this instance is integral with the friction member 57. The outer free end 55a of the clutch arm 55 normally bears against an inwardly directed projection 62a formed on the clutch detent 62. This detent is spring-biased in the direction of the clutch arm by means of a spring 63 and is pivotally mounted on a supporting shaft 64 (see Figs. 1, 3 and 4) extending between the front and rear plates 14 and 15. In order to limit inward movement, the clutch detent 62 is further formed with an extended portion or abutment 62b designed for engagement with a stop means which, for convenience, may be one of the spacing pillars 16 previously mentioned.

Normally, with the portion 55a bearing against the projection 62a of the clutch detent 62, the clutch arm 55 is urged in a counterclockwise direction about the pivot 60, as viewed in Fig. 3, against the action of the spring 61 to cause the clutch arm 55 to be disengaged from the wedge-shaped periphery of the constantly rotating disc 54 so that the time-correcting drive assembly is forcibly held against rotation or declutched. However, as will be described presently when the clutch detent 62 is rocked in a clockwise direction, as viewed in Fig. 3, the projection 62a will move away from the portion 55a allowing the spring 61 to move the clutch arm 55 in a clockwise direction about its pivot 60 and effect a substantially solid tractional clutching engagement between the disc 54 and the clutch arm 55 causing the time-correcting drive assembly to rotate uniformly throughout one complete revolution during the course of one minute. Such rotation of the time-correcting drive assembly occurs only during the correction cycles which commence at the fourteenth, twenty-ninth, forty-fourth, and fifty-ninth minutes of each hour and which terminate precisely at the fifteenth, thirtieth, forty-fifth and zero or sixty minutes, respectively, of each hour.

Referring now to Fig. 4 particularly, adjacent the master drive cam 59, there is shown a bifurcated crank arm or rocker member 70, having a roller 71 adjacent the end of one of its arms rotatably mounted thereto by means of a pin 72, which roller rides on the cam surface of the master cam 59. The bifurcated rocker arm is rigidly secured to the forward end of a hub or sleeve 73 which is pivotally mounted on the supporting shaft 64. The opposite or rear end of the sleeve 73 has rigidly secured thereto a curved crank or seconds correcting arm or lever member 74. This lever has a roller 75 rotatably mounted thereto adjacent its outer end by means of a pin 76, and is axially spaced on hub 73 so as to operatively coact with the previously mentioned seconds cam 26 attached to the seconds shaft 21. The crank arm 70 and curved seconds correcting arm 74 have a definite angular relationship with respect to each other. Both arms are resiliently biased in a clockwise direction about the shaft 64 by means of a spring 77 attached to a projection on the arm 74 and a stationary stud 78 (see Figs. 3 and 4), the latter being fixed to the front plate 14. Normally, the seconds correcting arm 74 is urged against a stop which, for convenience, is one of the spacing pillars 16 previously mentioned, and the roller 71 attached to the main crank arm 70 occupies a position in contact with the lowest dwell point of drive cam 59, as shown by Fig. 4. When in the normal position, roller 75 is held out of the path of movement of the cam 26 by means of the spring 77.

A curved minutes correcting arm or member 81, having an outer free end has a roller 82 rotatably mounted thereto at 83, is pivotally journaled on the hub 73 and axially spaced so as to operatively coact with the previously mentioned minutes cam 36 attached to the minutes sleeve 22, as will appear later. The arm 81 is independently spring-biased in a clockwise direction by a spring 84 attached to an extension on the arm 81 and the stud 78. Normally, the spring 84 holds the arm 81 against a stop provided by one of the spacing pillars 16 and in this position the roller 82 is held out of the path of movement of minutes cam 36.

A latch or hook lever 85 is positioned adjacent to the minutes arm 81 and is fixedly secured to the hub 73 to bear a predetermined angular relationship with respect to the main crank arm 70. The hook lever 85 is designed to operatively coact with a gravity responsive pawl 86 which is pivotally and loosely attached to an outer extension of the curved minutes correcting lever or arm 81 at 87, as will be described subsequently. Clockwise movement of the pawl 86 is limited by a projecting nose 86a which abuts a laterally extending abutment 81a on the arm 81.

A curved hours correcting arm or lever member 91, having an outer free end with a roller 92 rotatably mounted thereon at 93, is also pivotally journaled on the hub 73 and axially spaced so as to operatively coact with the hours cam 47 attached to the hours sleeve 23, which will be described later. The hours correcting arm 91 is also resiliently biased in a clockwise direction by a spring 94 attached to a projection on the arm 91 and the stud 78. Normally, the arm 91 is held against one of the spacing pillars 16 to provide a stop and the roller 92 is thereby held out of the path of movement of hours cam 47.

The other end of the bifurcated rocker arm 70 has a hook lever portion 70a positioned adjacent the hours correcting arm 91. As previously stated, arm 70 is firmly secured to the hub 73. The hook lever portion 70a is designed to operatively coact with a gravity responsive pawl 96 pivotally and loosely attached to an outer projection on the curved arm 91 at 97. Clockwise movement of pawl 96 is limited by the projecting nose 96a engaging a laterally extending abutment 91a of the arm 91.

It has been explained previously that at the fourteenth, twenty-ninth, forty-fourth and fifty-ninth minutes after each chronological hour, the clutch detent 62 is adapted to be tripped and thereby release the clutch arm 55 which permits the time-correcting drive assembly to commence a cycle of rotation, during which time it rotates through one complete revolution. Tripping of the clutch detent 62 is effected under the control of an electromagnet 100 (see Fig. 1) which, upon energization thereof by means of a high frequency signal of a predetermined duration, attracts its armature 101 and sets into action a time delay mechanism the nature of which will be explained fully hereinafter. The receiver unit 99 is a typical receiver of the type shown in Fig. 7 of the J. L. Wagner et al. Patent 2,647,360 issued August 4, 1953, and responsive to the high frequency signals which are superimposed on the power line 17a for the purpose of energizing electromagnet 100. From the instant of energization of the electromagnet 100 until the instant of tripping of the clutch detent 62, a predetermined period of time intervenes for the purpose of preventing stray or transient high frequencies coming over the power line and of shorter duration than the predetermined period of time from affecting the clutch detent 62. In conjunction with the preferred embodiment presently being described, we have elected to use a delay interval of three seconds. Actually then, the energizing signal, which is of such high frequency as to not disturb the normal functions of the 60-cycle current frequency constantly issuing over the line, is applied to the electromagnet 100 approximately three seconds before the commencement of each correction period, however, the clutch detent 62 is not tripped until three seconds has elapsed.

The time delay mechanism is shown in Figs. 3 and 4 in the position which it assumes at the instant of energization of the electromagnet 100. The electromagnet 100 is secured in a bracket 102 (Fig. 1), which, in turn, is secured to the rear plate 15 of the clock movement. The armature 101 of the electromagnet 100 is pivoted on a pair of trunnions 103 projecting from bracket 102. An actuating arm 101a, integral with the armature 101, extends upwardly therefrom along one side of the magnet 100. A gravity responsive sector member 106 is loosely pivoted on a stud 107 attached to the actuating arm 101a and is provided with a V-slotted periphery designed for tractional engagement with the rotating disc 54. An adjustable outwardly projecting pin 108 is secured to the sector member 106 at such an angular relationship between sector member 106 and detent 62 to provide a delay interval of three seconds.

When the magnet 100 is energized and the armature 101 is attracted, the peripheral surface of the sector member 106 is moved into a tractional engagement with the rotating disc 54, as shown by Figs. 3 and 4. Such tractional engagement causes the sector member 106 to be moved in a counterclockwise direction about its pivot 107 which, in turn, elevates the pin 108. After an interval approaching three seconds, the pin 108 will engage a projection on the clutch detent 62 to rock the same to release the clutch detent 62a, thereby releasing the clutch arm 55. This action initiates a correction cycle. When the magnet 100 is de-energized, the sector member 106 is removed from tractional engagement with disc 54 and, under the influence of gravity, is restored to its normal position wherein it bears against a stop 109 attached to the actuating arm 101a.

According to the illustrative embodiment, means are provided for automatically and selectively correcting the seconds hand, the seconds and minutes hands, the seconds, minutes and hours hands. The seconds hand is corrected every fifteen minutes; the seconds and minutes hands are corrected every hour; the seconds, minutes and hours hands are corrected every twelve hours. Herein, errors up to 29 seconds are corrected during the correction cycle which occurs every fifteen minutes; errors up to 29 minutes are corrected during the correction cycle which occurs every hour; errors in excess of 29 minutes are corrected during the correction cycle which occurs every twelve hours. Generally, the frequency of the available alternating current is closely regulated at the source and synchronous motor driven clocks will seldom vary more than a fraction of a minute, unless there be an interruption in the power supply. The illustrative embodiment provides for a complete range of correction within every twelve hour period.

Attention will be given now to the manner in which each of the corrective cycles is effected.

Seconds hand correction

For the purpose of description, it will be assumed that a high frequency electrical time signal or impulse is received by the electromagnet 100 from a master clock or other source of standard time, not shown. It will also be assumed that the transmission of the impulse will begin at approximately three seconds before the fourteenth, twenty-ninth, forty-fourth and fifty-ninth minutes of each hour as controlled by the standard time source. In the case of seconds hand correction, this impulse must have a duration of three seconds in order to release the time-correction drive assembly. The impulse will energize the electromagnet 100 and the latter will attract its armature 101 and thereby move the sector member 106 into a tractional engagement with the rotating disc 54, as shown by Figs. 3 and 4. The sector member 106 and pin 108 move counterclockwise about the pivot stud 107. After three seconds have elapsed, pin 108 engages clutch detent 62 and releases the clutch arm 55. The clutch arm 55 is spring-biased so that the end portion 55a engages with disc 54 whereby the time-correction drive assembly will be caused to rotate through one revolution, as previously described.

During the correction cycle, the roller 71 attached to one end of the bifurcated arm 70 will follow on the surface of drive cam 59 from the point of lowest dwell to the point of highest dwell and then quickly drop off to the point of lowest dwell. This action will cause arms 70 and 74 to be slowly rocked in a counterclockwise direction on the shaft 64, followed by a rapid return in a clockwise direction to the normal position at the instant of drop off of the arm 70. The roller 75 attached to arm 74 will move in an arc about the shaft 64 so as to engage the surface of the seconds correction cam 26, which is attached to the seconds shaft 21. If the clock movement is on time with respect to the standard time source, the roller 75 at some instant during the correction cycle will follow the surface of the seconds cam 26 as the seconds shaft 21 is rotated in its normal clock-driven manner. If the clock movement is seconds slow with respect to the standard time, the roller 75 will engage the surface of the seconds cam 26 and forcibly advance the same in a clockwise direction to a position coincident with the standard time. The friction member 25 permits relative rotary movement between the seconds shaft 21 and the normal driving means when required for seconds hand time-correcting operations. If the clock movement is seconds fast with respect to the standard time, the roller 75 will not engage the surface of cam 26 in the normal manner for advancing the same. Instead the cam 26 and seconds shaft 21 will continue to rotate in a clockwise direction by way of the normal driving means until the drop-off surface of cam 26 intercepts the roller 75. This will prevent the cam 26 from advancing, however, roller 75 will continue to be moved in an arc towards the lowest dwell point 111 of the seconds cam 26.

As the correction cycle terminates, the portion 55a of clutch arm 55 will encounter the clutch detent 62a and will be forcibly urged out of engagement with disc 54. This action stops the time-correcting drive assembly. At this instant the seconds hand 11 will be in the zero or sixty minute position and the roller 71 attached to the bifurcated arm 70 will drop off of the high point of drive cam 59. Arms 70 and 74 under the tension of spring 77 will be rapidly restored to the normal position, thereby releasing the clock movement to the control of the normal driving means, with the attendant result that the time indicated by the seconds hand will then be coincident with the standard time source.

Seconds and minutes correction

In this case, the high frequency impulse received by the electromagnet 100 will begin at approximately three seconds before the fifty-ninth minute of each hour as controlled by the standard time source. This impulse must have a duration of approximately six seconds in order to release the time-correcting drive assembly and latch up the minutes correcting arm 81. The time-correcting drive assembly will be tripped three seconds after the impulse is applied to the electromagnet 100, in the same manner as previously described.

A lever 110 attached to the actuating arm 101a and extending laterally therefrom serves as an actuating means for the pawl 86 pivotally attached to the minutes correcting arm 81 at 87. When the armature 101 is in the attracted position, lever 110 urges the pawl 86 counterclockwise about its pivot 87 and pawl 86 is held inwardly for an additional three seconds after the time-correcting drive assembly has been latched by the six-second pulse. As previously explained, the drive cam 59 of the time-correcting drive assembly causes arm 70 and hub 73 to be slowly moved in a counterclockwise direction on the shaft 64. The minutes lever 85, which is attached to hub 73, will also move in a counterclockwise direction and prior to the termination of the three second interval following the tripping action of the detent 62 the hooked portion 85a of lever 85 will latch with the portion 86b of the pawl 86. When the impulse to magnet 100 terminates, armature 101 will be restored to its normal de-energized position. The latching action of lever 85 and pawl 86 will cause the minutes correcting arm 81 to be moved in a counterclockwise direction along with the seconds correcting arm 74. The seconds hand will be corrected in the same manner as previously described. Concurrently with the seconds hand correction, the roller 82 attached to arm 81 will engage and cause the cam 36 attached to the minutes sleeve 22 to be correctively positioned by shifting of the friction member 35a in substantially the same manner as described above for the seconds hand correction. If the minutes hand 12 conforms to the correct time, the independent arcuate movement of the roller 82 will follow the surface of the rotating minutes cam 36 to the point of lowest dwell 112 as the clock movement is driven by the normal driving means. If the minutes hand 12 is either slow or fast with respect to standard time, the roller 82 will forcibly urge cam 36 so as to position the minutes hand 12 in accordance with the correct time.

As the correction cycle terminates, both the seconds hand 11 and the minutes hand 12 will be in the zero or sixty minute position and the time-correcting drive assembly will be declutched. As this occurs, arms 70, 74 and 81 are rapidly restored to their normal positions, thereby releasing the clock movement to the control of the normal driving means, with the result that the time indicated by the seconds and minutes hands are coincident with the standard time source.

Seconds, minutes and hours correction

In this case, the impulse applied to the electromagnet 100 will begin at approximately three seconds before the fifty-ninth minute which precedes every twelfth hour as controlled by the standard time source. This impulse must have a duration of approximately nine seconds in order to release the time-correcting drive assembly and latch up both the minutes correction arm 81 and the hours correction arm 91. The time-correcting drive assembly will be tripped three seconds after the impulse is applied to electromagnet 100, in the same manner as previously described.

It is obvious the laterally extending lever 110 attached to the actuating arm 101a serves as an actuating means for both the pawls 86 and 96 pivotally attached to the arms 81 and 91, respectively. When the armature 101 is in the attracted position, lever 110 engages and urges the pawls 86 and 96 counterclockwise about their pivots 87 and 97, respectively. The pawls 86 and 96 are held inwardly for an additional six seconds after the time-correcting drive assembly has been tripped. As the drive cam 59 rotates arm 70 and hub 73 slowly in a counterclockwise direction, the arms 74 and lever 85, which are attached to hub 73, are rotated in a like manner. During the three second interval which follows the tripping action at the detent 62, lever 85 will latch with pawl 86, and during the succeeding three second interval, the hooked lever portion 70a of the bifurcated arm 70 will latch with pawl 96. It may be pointed out that the spacing between hook 70b of lever portion 70a and the latch portion 96b of pawl 96 is somewhat greater than the spacing normally existing between hook 85a of lever 85 and the hooked portion 86b of pawl 86. Consequently, a longer time interval is required to effect the latch-up action for the hours hand correction than is required to effect latch-up action for the minutes hand correction. This accounts for the variations in the time duration of the high frequency impulses applied to electromagnet 100 to effect the different time-correcting operations.

During the correction cycle the seconds hand will be corrected in the same manner as described above. The latch-up between lever 85 and pawl 86 will cause minutes correcting arm 81 to be moved in a counterclockwise direction. Roller 82 will engage the surface of minutes correcting cam 36 attached to the minutes sleeve 22 at some instant during the correction cycle as previously described. If the minutes hand 12 conforms to the correct time, the independent arcuate movement of the roller 82 will follow the surface of the rotating minutes cam 36 to the point of lowest dwell 112 as the clock movement is driven by the normal driving means. If the minutes hand 12 is either slow or fast with respect to standard time, the roller 82 will forcibly urge cam 36 so as to position the minutes hand 12 in accordance with the correct time.

The hours hand 13 will be positioned in a similar manner. The lever portion 70a of bifurcated arm 70 will latch up pawl 96 and thereby cause the hours correcting arm 91 to be moved in a counterclockwise direction. The roller 92 carried thereby will engage the surface of hours cam 47 attached to the hours sleeve 23 at some instant during the correction cycle. If the hours hand 13 conforms to the correct time, the arcuate travel of the roller 92 will follow the rotating surface of cam 47 to the point of lowest dwell 113 as the clock is driven by the normal driving means. If the hours hand 13 is either slow or fast with respect to standard time, the roller 92 will forcibly engage hours cam 47 and cause relative rotary shifting at the friction clutch 46 so as to position the hours hand 13 in accordance with the correct time.

At the termination of the correction cycle, the seconds hand 11, the minutes hand 12 and the hours hand 13 will be aligned with the zero or sixty minute position occurring at the zenith of the clock dial. The time-correcting drive assembly will be declutched by the detent 62 and the correcting arms 74, 81 and 91 will be restored to their normal positions by their respective springs. The clock movement is now restored to the control of the normal driving means.

A particular feature of the illustrative embodiment is the arrangement and construction of parts so as to eliminate bind or jamming characteristics during time-correcting cycles. It may be noted that each of the cams 26, 36 and 47 is provided with a slot 114 extending from a point on the cam surface adjacent the high point or lobe of each cam to a hole 115 located near the surface of the cam. This provides the lobe of each of the cams with a limited amount of yieldability. For the purposes of description, if cam 26 (see Fig. 4) were a solid cam without the slot 114 and the roller 75 in its arcuate path of counterclockwise movement were to strike the tip of the lobe in a dead-center poistion, then continued inward movement of roller 75 would result in a bind condition and may damage the mechanism. While it is unlikely that such a condition would exist frequently, there is a possibility that it could. Under the above conditions, the use of a slotted cam provides the lobe with limited yieldability wherein a continued force exerted by the roller 75 causes a slight bending of the lobe and enables the cam to be unbalanced from the dead-center position. Thus, the use of slotted cams eliminates the possibility of damage to the mechanism by jamming of the cams.

In addition, another feature is provided in that the path of movement of roller 75 describes an arc which does not intersect the axis of the seconds shaft 21. Thus, upon rotation of the arm 74 carrying the roller 75, the roller engages the cam 26 at an angle so as to apply a turning movement or correcting force thereto.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A secondary clock apparatus comprising a seconds hand mechanism, a minutes hand mechanism, an hours hand mechanism, motive means for driving said hand mechanisms at a timed rate, means for selectively resetting said hand mechanisms to a predetermined position, signal responsive means operative in response to a control impulse of variable duration, and time-correcting drive means rendered operative upon energization of said signal responsive means for operating said resetting means, the duration of the controlling impulse determining the number of said hand mechanisms to be reset.

2. In a secondary clock, the combination of a seconds hand unit, a minutes hand unit, an hours hand unit, driving means for said units, frictional means interconnecting each of said units and the driving means for operating said units at their normal timekeeping rates, means for selectively resetting said units to a predetermined position, signal responsive means operative in response to a control signal of variable duration, and time-correcting drive means rendered operative upon energization of said signal responsive means for operating said resetting means, the duration of the controlling signal determining the number of said units to be reset.

3. A secondary clock operated from a line circuit and over which a signal of variable duration is transmitted from a source of standard time, comprising a seconds hand unit, a minutes hand unit, an hours hand unit, a driving motor energized from the line circuit, frictional means interconnecting each of said units and the driving motor to rotate said units at their normal timekeeping rates, means including a seconds resetting cam connected to said seconds hand unit, means including a minutes resetting cam connected to said minutes hand unit, signal responsive means connected to the line circuit and energized by the signal transmitted from the standard time source, time-correcting drive means rendered operative upon energization of said signal responsive means for a predetermined duration, a seconds correcting member operatively connected to said time-correcting drive means and adapted to engage said seconds resetting cam, a minutes correcting member including a latch element associated therewith for operatively connecting the same to said time-correcting drive means, and means carried by the signal responsive means for operating said latch element when the control signal exceeds the predetermined duration to connect said minutes correcting member to said time-correcting drive means, said minutes correcting member being adapted to engage the minutes resetting cam to shift said minutes unit, if necessary, said seconds correcting member and said minutes correcting member being concurrently movable when said time-correcting drive means is operative to move said seconds hand unit and said minutes hand unit to a chronological position concident with the standard time source.

4. A secondary clock operated from a line circuit and over which a high frequency signal of predetermined duration is transmitted from a source of standard time, comprising a seconds hand unit, a minutes hand unit, an hours hand unit, a driving motor energized from said line circuit, frictional means interconnecting each of said units and the driving motor for driving said units at their normal timekeeping rates, a resetting cam connected to each of said units, signal responsive means connected to said line circuit and energized by the signal transmitted from the standard time source, time-correcting drive means rendered operative upon energization of said signal responsive means for a predetermined duration, a seconds correcting crank member operatively connected with said time-correcting drive means and adapted to operatively engage the resetting cam connected with said seconds hand unit to independently rotate the same, a minutes correcting crank member, a first shiftable latch element associated with said last-named crank arm for selectively connecting the same to said time-correcting drive means to engage the resetting cam connected with said minutes hand unit to independently rotate the same, an hours correcting crank member including a second shiftable latch element associated with said hours correcting member for connecting the same to said time-correcting drive means to engage the resetting cam connected with said hours hand unit, and means carried by said signal responsive means for engaging and shifting said first and second latches when the control signal exceeds the predetermined duration to connect said minutes and hours correcting crank members to said time-correcting drive means, said correcting crank members being concurrently movable when said time-correcting drive means is operative to independently and relatively shift the seconds hand unit, the minutes hand unit and the hours hand unit, respectively, to a chronological position coincident with the standard time source.

5. A secondary clock operated from a line circuit and over which high frequency signals of predetermined durations are transmitted from a source of standard time, comprising a seconds hand, a minutes hand, an hours hand, a driving motor energized from the line circuit, frictional means interconnecting each of said hands and the driving motor for driving said hands at their normal timekeeping rates, time-correcting drive means operated by said motor, means normally holding said time-correcting drive means inoperative, a high frequency responsive solenoid having an armature associated therewith connected to the line circuit, said armature being operative when said solenoid is energized by the signal to release said holding means to connect said time-correcting drive means with said driving motor, resetting means for the seconds hand connected with said time-correcting drive means, separate resetting means one each for the minutes hand and the hours hand, and an operating lever carried by said armature for engaging said resetting means when the signal exceeds the predetermined duration for operatively connecting the minutes and hours resetting means with said time-correcting drive means, whereby said hands may be independently moved to a predetermined position whenever said time-correcting drive means is rendered operative by the high frequency signal.

6. A secondary clock operated from a line circuit and over which high frequency signals of different characters are transmitted from a source of standard time, comprising a seconds hand, a minutes hand, an hours hand, a driving motor energized from the line circuit, frictional means interconnecting each of said hands and the driving motor for driving said hands at their normal timekeeping rates, means responsive to high frequency control signals received over the line circuit, time-correcting drive means operated by said motor, means normally holding said time-correcting drive means inoperative and releasable in response to a control signal received by said signal responsive means for operatively connecting said time-correcting drive means with said driving motor, and resetting means for each of said hands including mechanism responsive to a signal of one character for bringing the seconds hand to a predetermined position and responsive to a signal of another character for bringing the seconds hand and minutes hand to a predetermined position, and responsive to a signal of a third character for bringing all of said hands to a predetermined position.

References Cited in the file of this patent

UNITED STATES PATENTS

| | | |
|---|---|---|
| 1,830,750 | Chapman | Nov. 10, 1931 |
| 2,093,553 | Faller | Sept. 21, 1937 |
| 2,145,018 | Tweedale | Jan. 24, 1939 |
| 2,566,940 | Johnson et al. | Sept. 4, 1951 |
| 2,569,815 | Larrabee | Oct. 2, 1951 |
| 2,607,188 | Bourquin | Aug. 19, 1952 |